United States Patent [19]
Yang et al.

[11] Patent Number: 5,493,525
[45] Date of Patent: Feb. 20, 1996

[54] CARRY-CHAIN COMPILER

[75] Inventors: Lin Yang, Fremont; Chun-Ling Liu, Milpitas, both of Calif.

[73] Assignee: VLSI Technology, Inc., San Jose, Calif.

[21] Appl. No.: 445,505

[22] Filed: May 22, 1995

Related U.S. Application Data

[63] Continuation of Ser. No. 169,764, Dec. 20, 1993, abandoned, which is a continuation of Ser. No. 854,524, Mar. 20, 1992, abandoned.

[51] Int. Cl.$^6$ ...................................................... G06F 7/50
[52] U.S. Cl. ........................................ 364/786; 364/788
[58] Field of Search ...................................... 364/786–788

[56] References Cited

U.S. PATENT DOCUMENTS

| | | | |
|---|---|---|---|
| 3,553,446 | 1/1971 | Kruy | 364/788 |
| 4,764,887 | 8/1988 | Lai et al. | 364/787 |
| 5,018,093 | 5/1991 | Shih | 364/788 |
| 5,027,311 | 6/1991 | Zion | 364/788 |
| 5,043,934 | 8/1991 | Lamb | 364/787 |
| 5,126,965 | 6/1992 | Asato et al. | 364/788 |

*Primary Examiner*—Tan V. Mai
*Attorney, Agent, or Firm*—Burns, Doane, Swecker, & Mathis

[57] ABSTRACT

Carry-chain structures useful in circuits such as adders, subtractors, counters and arithmetic logic units (i.e., ALU's). The carry-chain structures have regular architectures that can be conveniently generated in various bit widths by automated compiler systems. In a preferred embodiment, a method for automatically generating a carry-chain circuit using a compiler which includes a library of cells by selecting a first cell from the library of cells for use as a carry propagation cell, and using the first cell for multiplexing a carry signal produced by the carry propagation cell, such that the carry-chain includes a plurality of first cells. Further, a carry-chain architecture is produced using the aforementioned method.

18 Claims, 3 Drawing Sheets

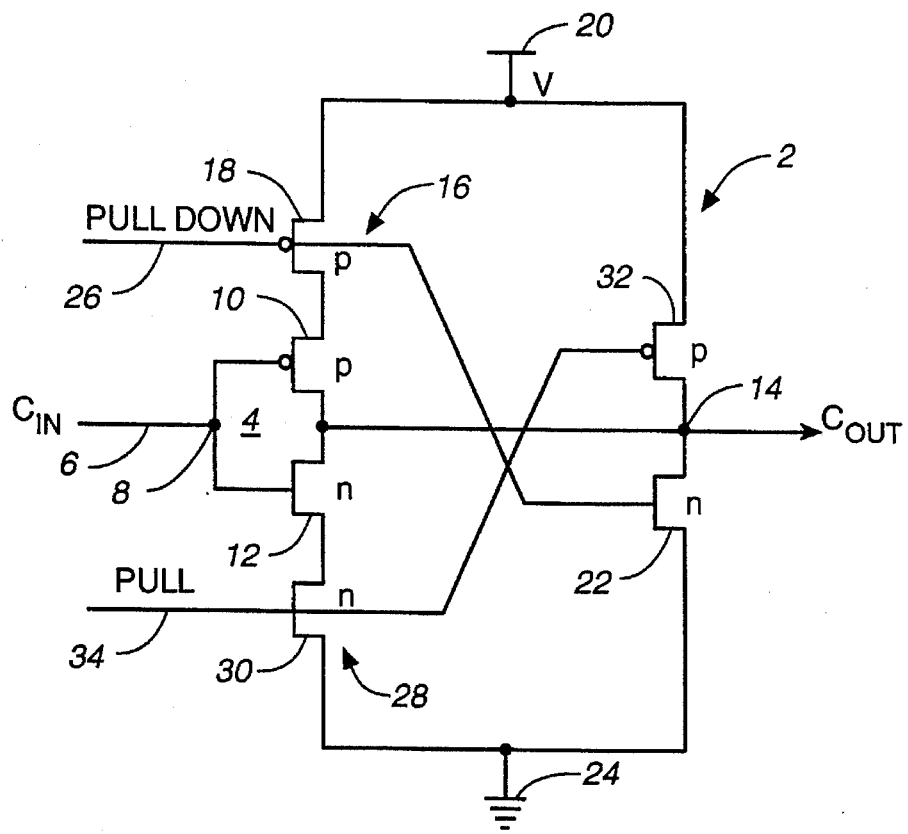
FIG._1
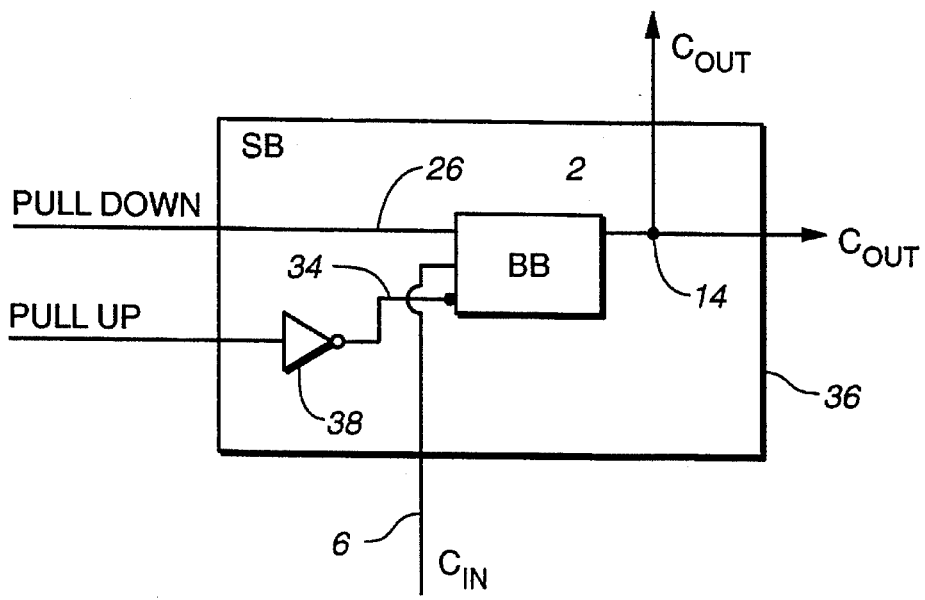
FIG._2

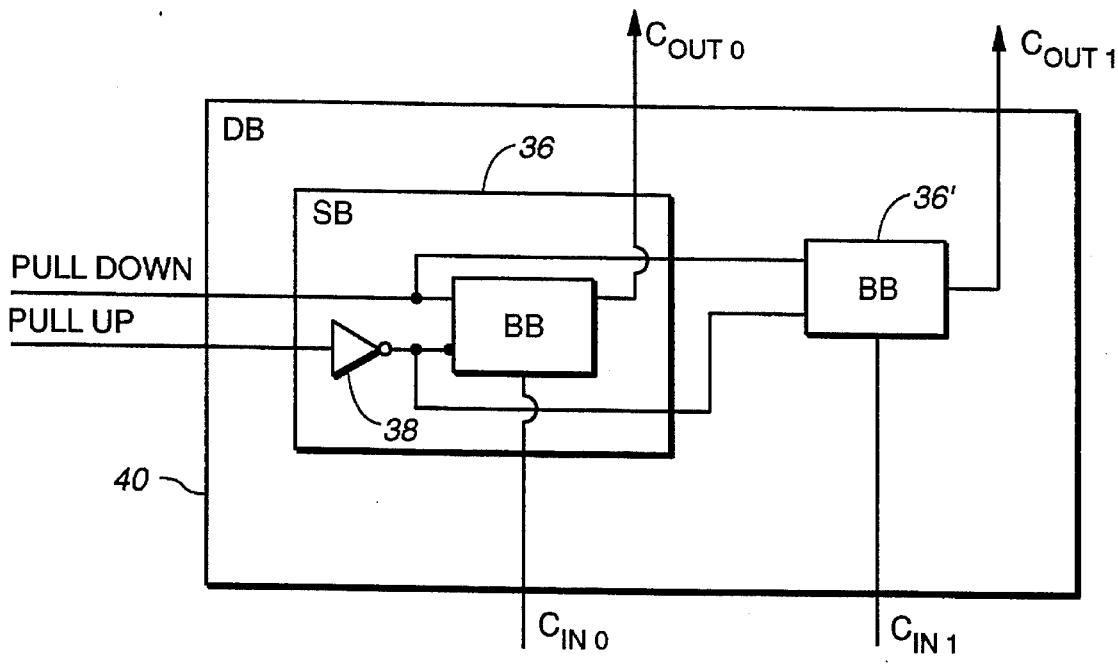
FIG._3
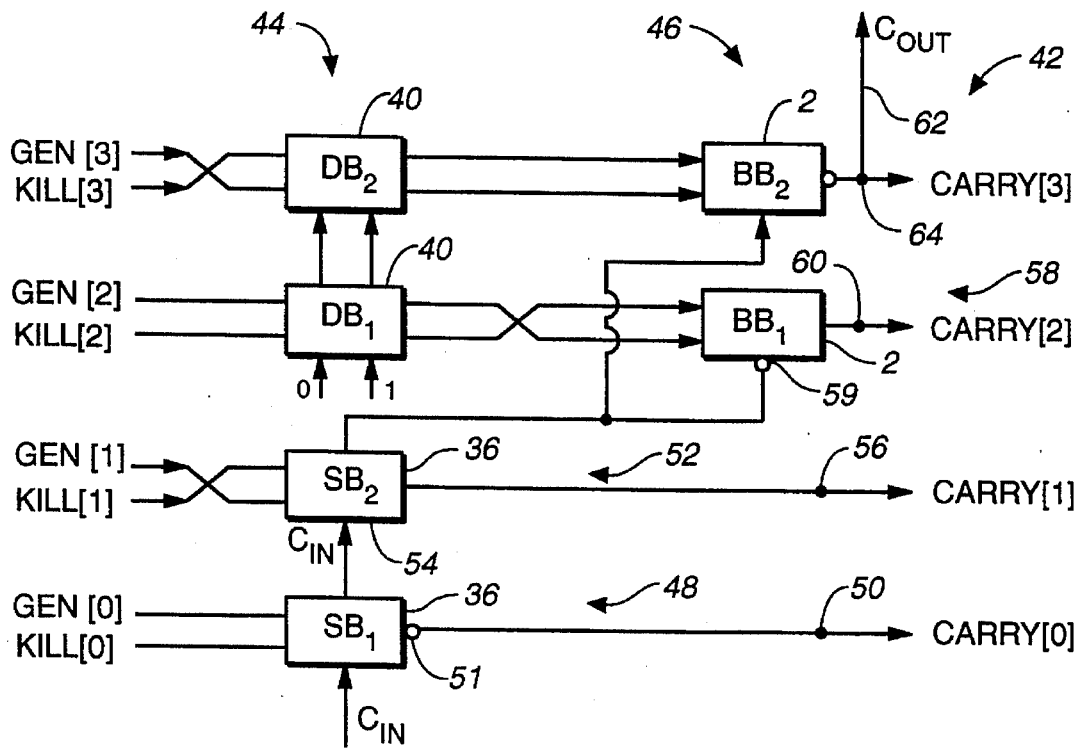
FIG._4

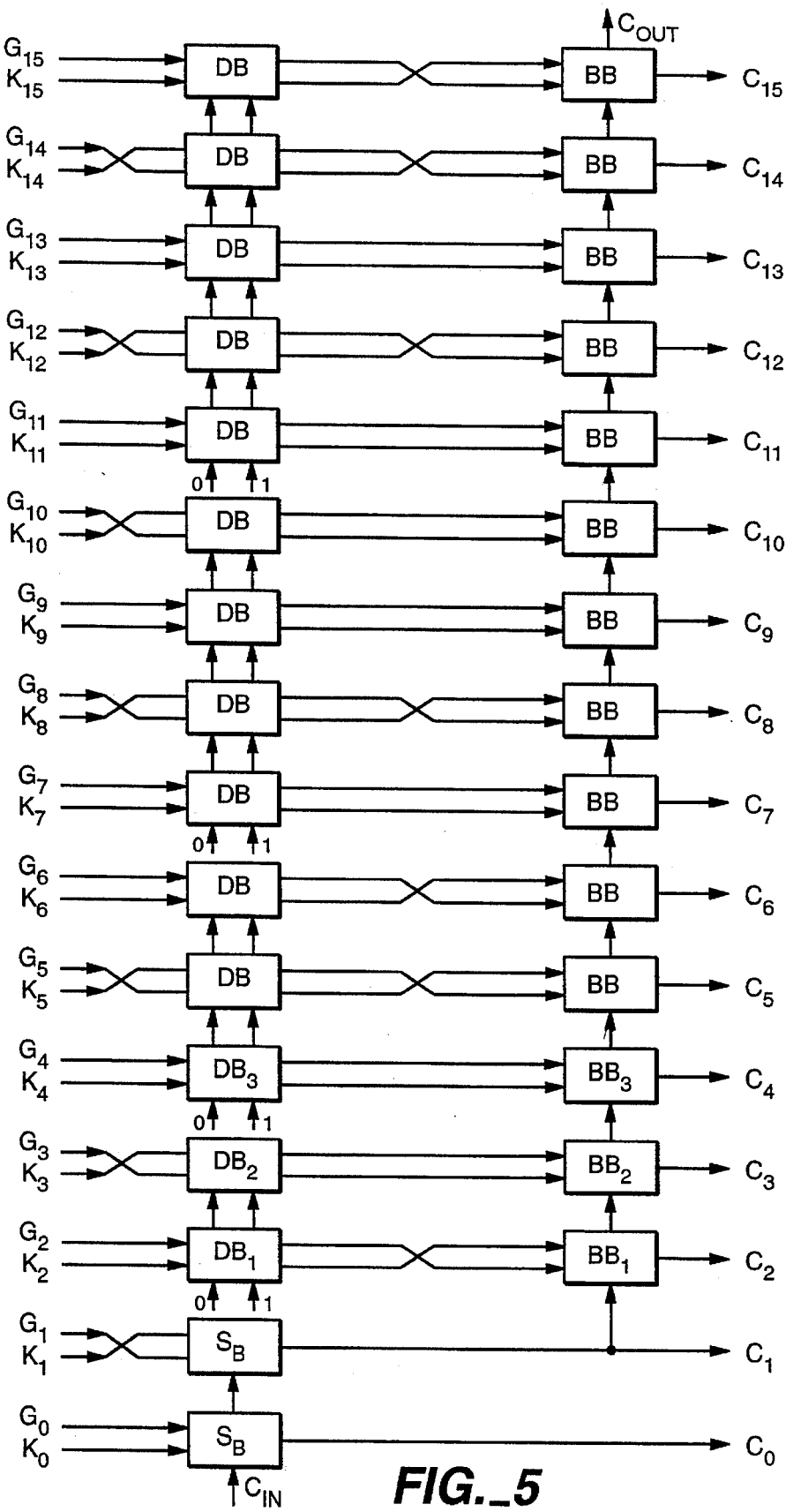
FIG._5

CARRY-CHAIN COMPILER

This application is a continuation of application Ser. No. 08/169,764 filed Dec. 20, 1993, now abandoned, which in turn is a continuation of application Ser. No. 07/854,524, filed Mar. 20, 1992, now abandoned.

BACKGROUND OF THE INVENTION

1. Field of the Invention

The present invention generally relates to compilers for generating application-specific integrated circuits and, more particularly, to compilers for generating carry-chain structures for use in application-specific integrated circuits.

2. State of the Art

It is well known to provide integrated circuits, or "chips", of the type known as application-specific integrated circuits (ASICs). In essence, ASIC chips are custom-designed circuits of the LSI (large scale integration) or VLSI (very large scale integration) class. ASIC chips often include one or more functional blocks or "cells" which, individually, may be classified as LSI or VLSI circuits. For instance, the cells within an ASIC chip may comprise one or more random access memories (RAMs), read-only memories (ROMs), or arithmetic logic units (ALUs). Also, cells can be as simple as an individual logic gate.

To efficiently and economically design ASIC chips, it is necessary to use automated systems, usually referred to as compilers. Compilers allow circuit designers to custom design ASIC chips by drawing upon libraries containing standardized designs of circuits that can comprise cells within ASIC chips. Also, compilers can themselves include compiling sub-systems. For example, in designing an ASIC chip with a compiler, a design engineer may want a functional block to include one or more ALU circuits and, rather than designing the ALU circuits himself, the engineer may want a compiling sub-system to design the ALU circuits while including some special connections that he has specified.

Compilers can, of course, generate circuits for uses other than in ASIC chips. For instance, compiler systems can design circuits for implementation on printed circuit boards. The following emphasis on compilers that generate ASIC chips is not intended to exclude their other USES.

In view of the preceding discussion, it can be appreciated that, for compiler systems to be practical and commercially acceptable, the systems must allow circuit designers flexibility in modifying functional blocks within ASIC chips. For instance, circuit designers often want the flexibility to modify standard ALU cells to accommodate different bit widths. For such modifications to be easily accomplished by automated compilers (or compiling subsystems), the standard cells must have regular and relatively non-complex architectures. At the same time, however, the standard cells usually must be able to process data quickly, so that their host circuits are not slowed. In particular, it is usually important that ALU cells operate at high speeds.

To provide high-speed ALU circuits, it is known to include high speed adder/subtractors. One example of a high speed adder is the so-called "conditional-sum adder". Conditional-sum adders are, for example, described at chapter 4 of the text Computer Arithmetic Principles Architecture, and Design, by Kai Hwang (Wiley, 1979). As explained in that text, conditional-sum adders can be grouped to accomplish operations such as multiplication and division. Furthermore, by employing additional logic elements, the adders can be transformed into ALU circuits that perform various binary logic operations as well as arithmetic operations.

High speed operation of conditional-sum adders is primarily attributable to their generating two different carry-out bits at individual adder stages. More particularly, at various internal stages, conditional-sum adders generate a first carry-out bit based upon the assumption that the actual carry-in bit to the stage will have one binary value (e.g., high or binary 1) and, also, generate a second carry-out bit based upon the assumption that the actual carry-in bit will have a complementary binary value (e.g. low or binary 0). The first and second carry-out bits are usually referred to as either "provisional" or "conditional" carry bits, and the two terms will be used interchangeably herein.

Because provisional sums and provisional carry-out bits can be calculated at various stages of a conditional-sum adder without the stages waiting for actual carry-in bits, numerous provisional additions can be made at the same time. Thereafter, the actual carry bits can "ripple" through a conditional-sum adder at a rate which is faster than with ordinary adders.

Although conditional-sum adders provide benefits in terms of data-handling speed at high bit widths, the fact that provisional carry-out bits are generated at numerous stages in the adders results in the devices being "architecturally" complex and irregular. Moreover, the architecture of those devices renders modifications, such as bit-width modifications, difficult to accomplish. Thus, conditional-sum adders of conventional architecture cannot be readily generated by computer algorithms and, therefore, are not well suited for use by automated compiling systems.

SUMMARY OF THE INVENTION

Generally speaking, the present invention relates to carry-chain structures useful in circuits such as adders, subtractors, counters and ALU's. The carry-chain structures have regular architectures that can be conveniently generated in various bit widths by automated compiler systems.

In a preferred embodiment, the invention relates to a method for automatically generating a carry-chain circuit using a compiler which includes a library of cells. The method includes the steps of selecting a first cell from the library of cells for use as a carry propagation cell, and using said first cell for multiplexing a carry signal produced by said carry propagation cell, such that the carry-chain includes a plurality of said first cells.

The present invention further relates to a carry-chain architecture which includes an array of cells for effecting carry signal propagation and carry signal multiplexing. Each of the individual cells includes an input circuit for receiving a carry-in signal, a pull-down circuit for receiving a first control signal, a pull-up circuit for receiving a second control signal, and an output node for producing a carry-out signal in response to said carry-in signal, said pull-down circuit and said pull-up circuit.

BRIEF DESCRIPTION OF THE DRAWINGS

The present invention can be further understood by reference to the following description and the appended drawings which illustrate the exemplary preferred embodiments of the invention. For purposes of description, identical components are given the same reference numerals in the various drawing figures. In the drawings:

FIG. 1 is a schematic block diagram of a basic block representing an exemplary embodiment of a cell according to the present invention;

FIG. 2 is a schematic block diagram of an exemplary single block represented as the FIG. 1 basic block with an inverted input;

FIG. 3 is a schematic circuit diagram of an exemplary double block represented as a combination of two FIG. 2 single blocks;

FIG. 4 is a schematic circuit diagram of a four-bit carry-chain composed of the blocks described with respect to FIGS. 1, 2 and 3; and FIG. 5 is a schematic circuit diagram of a sixteen-bit carry-chain composed of the blocks described with respect to FIGS. 1, 2 and 3.

DETAILED DESCRIPTION OF THE PREFERRED EMBODIMENTS

FIG. 1 shows an exemplary basic block 2 designed in accordance with the present invention. The basic block 2 can be stored as a single cell in a library of cells accessed by a compiler to automatically generate a carry-chain architecture. In accordance with the present invention, the basic block 2 can be selected from the library of cells for use as both a carry propagation cell and as a cell for multiplexing a carry signal produced by said carry propagation cell.

The FIG. 1 cell includes an input circuit 4 for receiving a carry-in signal on an input line 6. The input circuit further includes an input node 8 for receiving the carry-in signal and two series connected transistors 10 and 12. The transistor 10 is a pnp transistor having a gate, a drain and a source, the gate serving as a control input connected to the input node 8. The transistor 12 is an npn transistor having a gate, a drain and a source, the gate similarly serving as a control input connected to the input node 8. The drains of the transistors 10 and 12 are connected to form an output node 14.

The FIG. 1 cell further includes a pull-down circuit 16 for receiving a first control signal. The pull-down circuit is shown to include a first transistor 18 connected in series between a first voltage potential 20 (e.g., 5 volts) and the input circuit. More particularly, the drain of transistor 18 is serially connected to the source of transistor 10 in the input circuit. The pull-down circuit also includes a second transistor 22 connected in series between the output node and a second voltage potential 24 (e.g., ground). The first transistor 18 is a p-type (pnp) transistor having a gate connected to a first control signal input 26. The second transistor 22 is an n-type (npn) transistor, also having a gate connected to the first control signal input 26.

A pull-up circuit 28 of the FIG. 1 cell is provided for receiving a second control signal. The pull-up circuit is shown to include a first transistor 30 connected in series between the second voltage potential 24 and the input circuit. More particularly, the drain of transistor 30 is serially connected to the source of transistor 12 in the input circuit. The pull-up circuit also includes a second transistor 32 connected in series between the output node and the first voltage potential 20. The first transistor 30 is an n-type transistor having a gate connected to a second control signal input 34. The second transistor 32 is a p-type transistor, also having a gate connected to the second control signal input 34.

In operation, the basic block, or cell, shown in FIG. 1 is used to produce a carry-out signal at the output node 14 in response to the carry-in signal, the first control signal input to the pull-down circuit, and the second control signal input to the pull-up circuit. In the FIG. 1 embodiment, when the first control signal input to the pull-down circuit and the second control signal input to the pull-up circuit are inactive, a carry-in signal present at the input node 6 is inverted and propagated to the output node 14. In an exemplary embodiment shown in FIG. 1, the first control signal input to the pull-down circuit is active high and the second control signal input to the pull-up circuit is active low.

Thus, in an inactive mode the first control input signal to the pull-down circuit is logic level low (e.g., ground) and the second control input signal to the pull-up circuit is logic level high (e.g., five volts). In this mode, transistors 18 and 30 are turned on while transistors 22 and 32 are turned off. A logic level low carry-in signal therefore turns on transistor 10 to place a carry-out signal of output node 14 at the first voltage potential 20 (e.g., five volts). On the contrary, a logic level high carry-in turns on transistor 12 to place the carry-out signal of output node 14 at the second voltage potential 24 (e.g., ground). In summary, the inactive mode causes the carry-out signal to be driven to a logic state which is a function of the carry-in signal.

The first and second control signals input to the pull-down and pull-up circuits, respectively are used to drive the carry-out signal to a predetermined logic level state regardless of the carry-in signal. In the FIG. 1 embodiment, if the first control signal input to the pull-down circuit is rendered active (i.e., logic level high, five volts), the carry-out signal of output node 14 is driven to a logic level low. That is, the first control signal turns off the transistor 18 and turns on the transistor 22, thus placing the output node 14 at the second voltage potential 24 (i.e., ground) regardless of the carry-in signal's logic level.

On the contrary, if the second control signal is rendered active (i.e., logic level low, ground), the carry-out signal of output node 14 is driven to a logic level high. That is, the second control signal turns off the transistor 30 and turns on the transistor 32, thus placing the output node 14 at the first voltage potential (i.e., five volts) regardless of the carry-in signal's logic level.

As mentioned above, the basic block of FIG. 1 can be used in accordance with the present invention to perform both carry signal propagation and carry signal multiplexing. Thus, a plurality of these basic blocks can be compiled as an array to generate a carry-chain architecture which can be used in, for example, a user specified conditional-sum adder having a user selected bit width.

To simplify compilation of the FIG. 1 basic blocks into an array, a single block cell and a double block cell which can be generated from the FIG. 1 basic block will be described. Both the single block cell and the double block cell can be generated by a compiler which includes the basic block in the compiler's library. Alternately, the single block cell and the double block cell described herein can be separately stored as cells in the compiler memory.

FIG. 2 shows a schematic block diagram of an exemplary single block (SB) 36 which includes the FIG. 1 basic block 2. As shown in FIG. 2, the single block 36 also includes an inverter 38 for inverting the second control signal input to the pull-up circuit of the FIG. 1 basic block 2. The inverter 38 permits both the first control signal input to the pull-down circuit and the second control signal input to the pull-up circuit to be considered active high signal inputs to the single block 36.

FIG. 3 shows a schematic circuit diagram of an exemplary double block (DB) 40 represented as a parallel combination of two FIG. 2 single blocks 36 and 36'. As shown in FIG. 3, the first control signal is input to the pull-down circuits of both basic blocks shown. Further, the second control signal is input to the pull-down circuits of both basic blocks via an inverter 38. A separate carry-in and carry-out is provided for each of the blocks 36 and 36', respectively. A carry-in signal $C_{in.0}$ and a carry-out signal $C_{out.0}$ are shown with respect to the basic block 36, while a carry-in signal $C_{in.1}$ and a carry-out signal $C_{out.1}$ are shown with respect to the basic block 36'.

When the first and second control signals are inactive, the double block 40 provides two carry-out signals which are driven in response to the two carry-in signals. However, when either the first or second control signal is active, both of the carry-out signals are driven to a logic level high or logic level low (depending on which control signal is active), regardless of the carry-in signals.

FIG. 4 is a schematic circuit diagram of a four-bit carry-chain architecture 42 generated by a compiler. The FIG. 4 architecture is composed of an array of individual cells represented by the basic blocks described above with respect to FIGS. 1, 2 and 3.

The four-bit carry-chain of FIG. 4 includes four stages for generating four carry-out signals labelled carry [0], carry [1], carry [2] and carry [3]. A first column 44 of input blocks are provided in the array, each of the input blocks including one or more individual cells. A second column 46 of output blocks is also provided in the array, with carry-out signals from at least some of the input blocks being directed to the output blocks.

First and second control signals labelled "gen [i]" and "kill [i]", where i=0 to 4, are provided to each of the input blocks in the first column. The control signal labelled "gen [i]" and the control signal labelled "kill [i]" are used to hard drive the output of a given stage in a carry-chain when the output from that stage can be determined in advance. Use of the "gen" and "kill" signals will thus reduce carry-signal propagation delays through a carry-chain.

Any time a bit location of an adder receives two "1's", the "gen" signal can be activated for the stage in the carry-chain associated with that bit location. For example, whenever the bit locations in two bytes to be added each include a binary "1" (e.g., if 010 is to be added to 010, the second bit locations in each byte are "1"), it can be immediately determined that a carry will be required to the next higher order bit location in the adder. This carry is effected using a carry-chain which includes a stage for each bit location of the adder.

An active "kill [i]" signal drives a carry-out of a given block to a logic level low. In the exemplary adder described above, if a "0" exists in the same bit location of two bytes which are to be added (e.g., if 101 is to be added to 000, the second bit location is "0" for both bytes), it can immediately be determined that a carry to the next stage in the carry-chain will not be necessary. Accordingly, in these instances, the carry-chain stage associated with the bit location under consideration can be hard driven to a logic low.

Where the bit locations of two bytes being added are different (e.g., if 010 is to be added to 000, the second bit locations in each byte are different), it can not be immediately determined whether a carry to the third stage of the carry-chain will be necessary. Rather, the need for a logic level high output from the second stage will depend on whether a logic level high is generated by the first stage (i.e., if there are two "1's" being added in the first stage). In these instances, neither the "gen" nor the "kill" can be activated for the second stage. Therefore, the second stage of the carry chain must await propagation of a logic level high carry-out from the first stage.

As shown in FIG. 4, a first stage 48 of the four-bit carry-chain architecture includes a single block 36 labelled $SB_1$. The first stage 48 receives "gen [0]" and "kill [0]" signals at its first and second control signal inputs, respectively. The "gen" and "kill" signals are provided from known logic in a manner as described above. Further, the first stage 48 receives a carry-in signal $C_{in}$ at its input node. A carry-out signal carry [0] is produced in response to the carry-in signal, "gen [0]" and "kill [0]". Because the single block 36 inverts the carry-in signal (as described with respect to FIGS. 1–3), the carry-out signal carry [0] is provided at a first stage output node 50 via an inverter 51. The signal at output node 50 thus corresponds to a delayed $C_{in}$ (i.e., delayed by the propagation time through the first stage).

A second stage 52 includes a single block labelled $SB_2$ which receives the carry-out signal from $SB_1$ (i.e., the inverted signal $C_{in}$) at its carry-in input 54. The carry-out signal from the first stage corresponds to the inverted carry-in signal $C_{in}$. The single block $SB_2$ thus operates as an active low block, having crossed control signal inputs for receiving the control signals "kill [1]" and "gen [1]" at its first and second control inputs, respectively.

A third stage 58 includes a double block 40, labelled $DB_1$ and a basic block 2, labelled $BB_1$. Control signals "gen [2]" and "kill [2]" are input to the block $DB_1$. Carry outputs (corresponding to inverted carry-in inputs to each of the basic blocks included in $DB_1$) are input to the block $BB_1$. An output signal carry [2] is output from the third stage to an output node 60.

In the double block $DB_1$, one of the basic blocks receives a logic level low (i.e., 0) at its carry-in and the other receives a logic level high (i.e., 1) at its carry-in. Because a carry-out signal from the block $SB_2$ is inverted via an inverter 59 for input as the carry-in signal to block $BB_1$, the block $BB_1$ can be considered to function as an active low block. For this reason, the two carry-out signals from the block $DB_1$ are crossed before being input to the block $BB_1$. The two carry-out signals from the block $DB_1$ are also input to the fourth stage 62.

The block $BB_1$ thus functions as a multiplexer which responds to carry-out signals from a first column block (i.e., $DB_1$) and to a carry-in signal from a preceding stage (i.e., $SB_2$). The carry-in signal received by the block $BB_1$ can be considered a select input for producing one of two output states from the third stage 58.

The fourth stage 62 is configured similar to the third stage, and includes a double block 40 labelled $DB_2$ and a basic block 2 labelled $BB_2$. Control signals "gen [3]" and "kill [3]" are input to the double block $DB_2$. As exemplified by the crossed control signal inputs, the fourth stage 62 receives the control signals "gen [3]" and "kill [3]" at its second and first control inputs, respectively. Again, this is because the carry-in signals to the double block of the fourth stage render the operation of this block active low (i.e., opposite to the operation of the block $DB_1$).

More particularly, the double block $DB_2$ includes two basic blocks, each of which receives a carry-out from the third stage double block at its respective carry-in. Because the carry-out signals of the third stage correspond to inverted carry-in signals of the third stage, the control signal inputs "gen [3]" and "kill [3]" are cross-coupled to inputs of the fourth stage double block.

The basic block $BB_2$ receives the two carry-out signals from the block $DB_2$. To further avoid propagation delays, the fourth stage basic block labelled $BB_2$ directly receives the carry-in signal $C_{in}$ at its carry-in from the block $SB_2$. An inverted signal carry [3] is output from the fourth stage basic block $BB_2$ to an output node 64, and can be used to continue the carry-chain.

FIG. 5 shows a schematic circuit diagram of a sixteen-bit carry-chain composed of the blocks described with respect to FIGS. 1, 2 and 3. The operation of the FIG. 5 carry-chain architecture is similar to that described above with respect to FIG. 4. For example, the FIG. 5 architecture includes a first column of input blocks and a second column of output blocks. The first column includes two single blocks 36 for the two least significant bits of the architecture (i.e., $C_0$ and $C_1$). All higher order stages include double blocks in the first column. A second column includes a basic block connected to each double block of the first column.

Each row of the FIG. 5 architecture corresponds to a stage of the carry-chain architecture as described with respect to FIG. 4. As can be seen in FIG. 5, the "gen" and "kill" inputs to each of the second, fourth, sixth, ninth, eleventh, thirteenth and fifteenth rows are cross-coupled to account for active low operation due to inversion of carry-in signals received from a preceding stage. Further, carry-outputs from double blocks to second column basic blocks in each of the third, sixth, seventh, ninth, thirteenth, fifteenth and sixteenth rows are cross-coupled to account for inversion of the carry-in signal received by each of these blocks from a single block or basic block in a preceding stage (i.e., less significant bit location).

As can be seen, the first four stages in FIG. 5 correspond to the four stages shown in FIG. 4. Carry-in lines which are shown to pass through a block in FIG. 5 represent direct connections between carry-inputs to succeeding stages (i.e., as was described with respect to basic blocks $BB_1$ and $BB_2$ in FIG. 4). Inverters as described with respect to FIG. 4 are used to account for blocks rendered active low by the FIG. 5 architecture or to match all stages such that a carry condition from one stage to another is always represented by the same logic state (i.e., a logic high is used in FIGS. 4 and 5).

Thus, in both the FIG. 4 and FIG. 5 embodiments, an array is configured wherein a first column includes at least two first-type blocks, each of which includes a single one of the individual cells. Further, the first column includes at least two second-type blocks, each of which includes two of the individual cells.

A second column of output blocks is also provided in each of FIGS. 4 and 5, with carry-out signals from the first column of input blocks being input to the second column of output blocks. The second column includes at least two third-type blocks, each of which includes a single one of the individual cells. At least one of said third-type blocks is provided for each of said second-type blocks in the first column, each of the third-type blocks including two inputs for receiving carry-out signals from the two individual cells in a second-type block.

The foregoing has described the principles, preferred embodiments and modes of operation of the present invention. However, the present invention should not be construed as being limited to the particular embodiments discussed. Instead, the invention should be understood to generally provide carry-chain structures that have sufficiently regular architecture that they can be conveniently generated by automated compiler systems. The actual carry-chain structure can be implemented for use as an adder, a subtractor, an ALU circuit, and other devices. Thus, the above-described embodiments should be regarded as illustrative rather than restrictive, and it should be appreciated that workers skilled in the art may make variations in those embodiments without departing from the spirit or scope of the present invention as defined by the following claims.

What is claimed is:

1. A carry-chain architecture comprising;

a first stage having a first cell for effecting carry signal propagation of a first provisional carry signal and a second provisional carry signal and at least one multiplexer cell for effecting carry signal multiplexing to select one of said first provisional carry signal and said second provisional carry signal as a first carry-out signal, said first carry-out signal being input to at least two additional multiplexer cells to select carry-out signals of additional stages, the number of carry-out signals selected by said first carry-out signal being greater than a number of carry-out signals selected by a carry-out signal of a preceding stage in the carry chain architecture;

at least one of said additional stages having a first cell for effecting carry signal propagation of a provisional carry signal and said at least two additional multiplexer cells for effecting carry signal multiplexing to produce a second carry-out signal in response to said first carry-out signal, each of said first cells and said multiplexer cells including:

an input circuit for receiving a carry-in signal;

a pull-down circuit for receiving a first control signal;

a pull-up circuit for receiving a second control signal; and an output node for producing an output signal in response to said carry-in signal, said pull-down circuit and said pull-up circuit.

2. Architecture according to claim 1, wherein said input circuit further includes:

an input node for receiving said carry-in signal;

two series connected transistors, each having a control input connected to said input node.

3. Architecture according to claim 2, wherein said two series connected transistors further include:

a first p-type transistor having a gate, a drain and a source; and a first n-type transistor having a drain connected to said source of said first p-type transistor, and connected to said output node.

4. Architecture according to claim 1, wherein said pull-down circuit further includes:

a first transistor connected in series between a first voltage potential and said input circuit; and a second transistor connected in series between said output node and a second voltage potential.

5. Architecture according to claim 4, wherein said pull-up circuit further includes:

a first transistor connected in series between said input circuit and said second voltage potential; and a second transistor connected in series between said output node and said first voltage potential.

6. Architecture according to claim 5, wherein said first pull-up circuit transistor is an n-type transistor, and said second pull-up circuit transistor is a p-type transistor.

7. Architecture according to claim 5, wherein said first pull-down circuit transistor further includes:

a gate which is connected to a gate of said second pull-down circuit transistor.

8. Architecture according to claim 7, wherein said first pull-up circuit transistor further includes:

a gate which is connected to a gate of said second pull-up circuit transistor.

9. Architecture according to claim 4, wherein said first pull-down circuit transistor is a p-type transistor, said second pull-down circuit transistor is an n-type transistor, and said second voltage potential is ground.

10. Architecture according to claim 1, further including:

a first column of input blocks in an array, each of said input blocks including one or more of said first cells, at least one successive input block in said first column receiving at least one carry-out signal from a preceding input block in said first column.

11. Architecture according to claim 10, wherein said first column of input blocks includes:

at least two first-type blocks each of which includes a single one of said first cells; and at least two second-type blocks, each of which includes two of said first cells.

12. Architecture according to claim 11, further including:

a second column of output blocks, carry-out signals from said first column of input blocks being input to said second column of output blocks.

13. Architecture according to claim 12, wherein said second column includes:

at least two third-type blocks, each of which includes a single one of said multiplexer cells; and an inverter connected to at least one input of the multiplexer cell in at least one of said third-type blocks.

14. Architecture according to claim 13, wherein at least one of said third-type blocks is provided for each of said second-type blocks in said first column, each of said third-type blocks including two inputs for receiving carry-out signals from the two cells in a second-type block.

15. Architecture according to claim 1, wherein said pull-up circuit further includes:

an inverter for inverting the second control signal.

16. Architecture according to claim 1, wherein said first cells and said multiplexer cells are arranged as a plurality of carry-select stages, with at most a single unit delay between any two stages.

17. A carry-chain architecture having plural stages which each include a carry signal multiplexer cell for use in an integrated circuit, each carry-signal multiplexer cell comprising:

an input circuit for receiving a carry-in signal;

a pull-down circuit for receiving a first control signal;

a pull-up circuit for receiving a second control signal, said pull-up circuit including an inverter for inverting the second control signal; and an output node for producing a first carry-out signal selected in response to said carry-in signal, said pull-down circuit and said pull-up circuit, said first carry-out signal being input to at least two additional carry signal multiplexer cells to select carry-out signals of additional stages, the number of carry-out signals selected by said first carry-out signal being greater than a number of carry-out signals selected by a carry-out signal of a preceding stage in the carry chain architecture.

18. A carry-chain architecture comprising:

a first stage having a first cell for generating at least two provisional carry-out signals and a second cell for selecting one of said at least two provisional carry-out signals as a first carry-out signal, said first carry-out signal being input to at least two additional multiplexer cells to select carry-out signals of additional stages, the number of carry-out signals selected by said first carry-out signal being greater than a number of carry-out signals selected by a carry-out signal of a preceding stage in the carry chain architecture; and at least one of said additional stages having a first cell for generating at least two provisional carry-out signals, and having a second cell for selecting one of said at least two provisional carry-out signals of said at least one additional stage as a second carry-out signal in response to said first carry-out signal, said first and second cells being configured such that there is at most a single unit delay between generation of said first carry-out signal and said second carry-out signal.

* * * * *